United States Patent
Chu et al.

(10) Patent No.: US 6,337,771 B1
(45) Date of Patent: Jan. 8, 2002

(54) ANTI-REFLECTION HIGH CONDUCTIVITY MULTI-LAYER COATING ON CRT SURFACE MADE BY VACUUM SPUTTERING AND WET COATING

(75) Inventors: Jau-Jier Chu; Jau-Sung Lee, both of Hsinchu (TW)

(73) Assignee: Applied Vacuum Coating Technologies Co., Ltd., Hsinchu (TW)

( * ) Notice: Subject to any disclaimer, the term of this patent is extended or adjusted under 35 U.S.C. 154(b) by 0 days.

(21) Appl. No.: 09/563,406

(22) Filed: May 3, 2000

(51) Int. Cl.⁷ .............................. G02B 1/11; G02B 5/28; B05D 5/06
(52) U.S. Cl. ..................... 359/586; 359/588; 427/109; 427/167; 313/635
(58) Field of Search ................. 359/580, 582, 359/586, 588, 589, 601; 313/635; 427/109, 167, 168, 126.2

(56) References Cited

U.S. PATENT DOCUMENTS

| | | | |
|---|---|---|---|
| 4,387,960 A | * 6/1983 | Tani | 359/586 |
| 5,091,244 A | * 2/1992 | Biornard et al. | 359/589 |
| 5,170,291 A | * 12/1992 | Szczyrbowski et al. | 359/580 |
| 5,407,733 A | * 4/1995 | Bjornard et al. | 359/586 |
| 5,541,770 A | * 7/1996 | Pellicori et al. | 359/585 |
| 5,652,477 A | * 7/1997 | Tong et al. | 313/635 |
| 5,869,129 A | * 2/1999 | Aben et al. | 427/64 |
| 5,925,438 A | * 7/1999 | Ota et al. | 428/141 |
| 5,981,059 A | * 11/1999 | Bright et al. | 428/336 |
| 5,993,898 A | * 11/1999 | Nagatsuka et al. | 427/162 |

* cited by examiner

Primary Examiner—Jon Henry
(74) Attorney, Agent, or Firm—Rosenberg, Klein & Lee

(57) ABSTRACT

An anti-reflection high conductivity multi-layer coating for CRT products includes three layers coating created by vacuum sputtering and a fourth layer coating created by wet coating process. A first layer, nearest to the substrate, is made of a transparent conductive oxide material having a refractive index within the approximating range of 1.85 to 2.1 at a wavelength of 520 nm. The second layer is formed from an oxide material having a refractive index within the range of 1.45 to 1.50 at a wavelength of 520 nm. The third layer is formed of an oxide material having a refractive index within the range of 1.85 to 2.2 at a wavelength of 520 nm. The fourth layer has a refractive index within the range of 1.45 to 1.55 at a wavelength of 520 nm.

9 Claims, 3 Drawing Sheets

ANTI-REFLECTION HIGH CONDUCTIVITY MULTI-LAYER COATING ON CRT SURFACE MADE BY VACUUM SPUTTERING AND WET COATING

BACKGROUND OF THE INVENTION

The present invention relates to a coating process composed of an optically effective layer system, for CRT glass substrate, whereby the layer system has a high anti-reflection and low resistivity effect. More specifically the invention relates to a combination of vacuum sputtering process which produce high conductivity of oxide films and a wet process which produce silica overcoat from traditional spin coating.

U.S. Pat. No. 4,921,760,whose disclosure is an multi-layer anti-reflection coating with excellent adhesion between $CeO_2$ layer and synthetic resin. The layer system including $CeO_2$, $Al_2O_3$, $ZrO_2$, $SiO_2$, $TiO_2$ and $Ta_2O_5$. All the thin films of the layer system are produce by vacuum evaporation or sputtering process. There are 3 to 5 thin layers in the layer system. For a given example, the total thickness of the 5 layer structure was about 3580 angstroms. The materials and thickness of the two most thicker films of the 5 layer structure are $CeO_2$, 1360 angstroms and $SiO_2$, 1220 angstroms respectively.

U.S. Pat. No. 5,105,310, whose disclosure is an multi-layer anti-reflection coating designed for deposition in in-line coating maching by reactive sputtering. The layer system including $TiO_2$, $SiO_2$, ZnO, $ZrO_2$ and $Ta_2O_5$. All the thin films of the layer system are produced from vacuum evaporation or sputtering process. There are 4 to 6 thin layers in the layer system. For a given example, the total thickness of the 6 layer structure was about 4700 Angstroms. The materials and thickness of two most thicker film of the layer system are ZnO, 1370 Angstroms and $SiO_2$, 1360 Angstroms respectively.

U.S. Pat. No. 5,091,244 and 5,407,733, disclosed a new type electric conductive light-attenuating anti-reflection coating. The major claim is an article comprision of nitrides of certain transition metal to provided an electrically-conductive, light-attenuating, anti-reflection surfaces. The layer systems including TiN, NbN, $SnO_2$, $SiO_2$, $Al_2O_3$, and $Nb_2O_5$. The thin films of the layer system are nitride and oxide materials. There are 3 to 4 thin layers in the layer system. For a given example, the total thickness of the 4 layer structure was about 1610 Angstroms. The materials and thickness of the two most thicker films of the layer system are ZnO, 650 Angstroms and $SiO_2$, 820 Angstroms, respectively. The transmission of visible light of these two layer systems is below 50%. All the thin films of the layer system are produced by vacuum evaporation or sputtering process.

U.S. Pat. No. 5,147,125, whose disclosure is a multi-layer, anti-reflection coating using zinc oxide to provide UV rejection for wave-lengths shorter than 380 nm. The layer system including $TiO_2$, $SiO_2$, ZnO, and $MgF_2$. All the thin films of the layer system are produced from vacuum evaporation or sputtering process. There are 4 to 6 thin layers in the layer system. For a given example, the total thickness of the 5 layer structure was about. 7350 Angstroms. The materials and thickness of the two major films of the layer system are Zno, 4390 Angstroms and $MgF_2$, 1320 Angstroms, respectively. All the thin films of the layer system are produced by vacuum evaporation or sputtering process.

U.S. Pat. No. 5,170,291 disclose a 4 layer system which is optical effective and has a high anti-reflective effect. The layers can be formed by either a pyrolytic method, a plasma-supported chemical vapor deposition met hod, a sputtering method or a chemical deposition method. The layer system including $SiO_2$, $TiO_2$, $Al_2O_3$, Zns, Mgo and $Bi_2O_3$. For a given sample, the total thickness of the 4 layer structure was about 2480 Angstroms. The materials and thickness of the two major films of the layer system are $TiO_2$, 1040 Angstroms and $SiO_2$, 940 Angstroms, Respectively.

U.S. Pat. No. 5,216,542 whose disclosure is a 5 layer coating with high anti-reflection effect. The process use an adhesive layer of Ni, Cr or NiCr metal with a thickness about 1 nm (manometer). Other four layers are compose of $SnO_2$, $ZrO_2$, ZnO, $Ta_2O_5$, NiO, $CrO_2$, $TiO_2$, $Sb_2O_3$, $In_2O_3$, $Al_2O_3$, $SiO_2$, TiN and ZrN. For a given example, the total thickness of the 5 layer structure was about 2337 angstroms. The materials and thickness of the two majority films of the layer system are $TiO_2$, 500 Angstroms and $SiO_2$, 1387 Angstroms, respectively. The transmission of visible light of this layer system is below 30%. All the thin films of the layer system are produced by vacuum evaporation or sputtering process.

U.S. Pat. No. 5,541,770 whose disclosure is a light attenuating anti-reflection coating including electrically conductive layers. It is a four or five layer system. A light absorption high refractive index metal such as Cr, Mo and W was used as a optically effective thin film in the layer system. The other three or four layers are $TiO_2$, ITO, $Al_2O_3$, $SiO_2$ and TiN. The patent shows that the majority materials of the layer system are oxide and nitride, only one metal film was used as an optical effective thin film in the anti-reflection coating. All the thin films of the layer system are produced by vacuum evaporation or sputtering process. For a given example, the total thickness of the 5 layer structure was about 1495 angstroms. The materials and thickness of the majority films of the layer system are ITO, 334 Angstroms and $SiO_2$, 720 Angstroms. The transmission of visible light of this layer system is below 60%.

U.S. Pat. No. 5,362,552 whose disclosure is a 6-layer anti-reflection coating includes three layers of electrically-conductive metal oxide. The layer system including $SiO_2$, ITO, $Nb_2O_5$, and $Ta_2O_5$. Up to a total optical thickness of about one-wavelength of visible light of the electrically conductive metal oxide may be included in the coating. For one of given example of 6 layer structure, the materials and thickness of the majority two layers within this 6 layer system are $SiO_2$, 854 Angstroms and ITO 1975 Angstroms. All the thin films of the layer system are produced by vacuum evaporation or sputtering process.

U.S. Pat. No. 5,579,162 whose disclose is a 4-layer anti-reflection coating for a temperature sensitive substrate such as plastic. One layer is a DC reactively sputtered metal oxide which may be deposited quickly and without imparting a large amount of heat to the substrate. The layer system including $SnO_2$, $SiO_2$ and ITO. For one of given example of the 4 layer structure, the materials and thickness of the majority two layers within this system are $SnO_2$, 763 Angstroms and $SiO_2$ 940 Angstroms. All the thin films of the layer system are produced by vacuum evaporation or sputtering process.

U.S. Pat. Nos. 5,728,456 and 5,783,049, disclosed an improved way to deposit anti-reflection coating on plastic film. The multi-layer thin films was coated by a roller coating with vacuum sputtering process. The layer system including ITO, $SiO_2$, and a thin lubricating over layer which is a solvent-soluble fluoropolymer. For a given example, the total thickness of the 6 layer system was about 2630 Angstrom. The materials and thickness of the two major film of the layer system are Ito, 888 Angstrom and $SiO_2$, 869 Angstrom.

The above description show clearly that all the films of a layer system with high anti-reflection effect was produced by vacuum evaporation and/or sputtering process. On the other hand, the thickness of the major layer of high refractive index materials in the layer system was between about 700 to 2000 angstrom and the thickness of the major layer of low refractive index materials in the layer system was between about 700 to 1400 angstrom.

SUMMARY OF THE INVENTION

An object of the present invention is to provide an anti-static coating by sputtering process combined with an anti-reflection coating by wet process.

The process of manufacturing transparent conductive oxide thin film in volume production was high reliable and was routinely need in the industries such as semiconductor, display, architecture glass and plastic web coating for a long time. Because of the low resistance and high transparent conductive oxide thin film was easy to deposit by sputtering process than wet process (either in process of spin coating or spray coating). The present invention provided the anti-static and anti-reflection coating in a combination system of vacuum sputtering and wet coating process. It is well known that the coating of conductive oxide materials such as $SnO_2$, ZnO, $In_2O_3$, $SnO_2$:F, $SnO_2$:Sb, $In_2O_3$:Sn, ZnO:Al, $Cd_2SnO_4$, $In_2O_3$—ZnO, $SnO_2$—ZnO and $In_2O_3$—MgO, etc. is quite high cost, low performance (high resistance), and low utilization (about 3~5% of chemical solution) from wet coating process. A roughly estimate show that for a conventional wet coating system of CRT surface of a total thickness of about 200 nm (ITO: 100 nm, silica: 100 nm) was required to form an anti-static effective ($10^3$~$10^5$ $\Omega$/square) and optically effective anti-reflection coating. Experimentally shows that wet coating process of conductive oxide materials such as ITO, ATO, IZO and AZO, etc. with a thickness above 100 nm impart low uniformity, high resistance, low transmittance and high cost due to the spin coating and dry baking from solution of those materials. For a typical conductive oxide sputtering process, the thickness of the thin film is below 50 nm to reach the resistance of $10^2$~$10^3$ $\Omega$/square, and the uniformity of the thin film is less than 3% which is important for optically effective in anti-reflection coating. On the other hand, for a wet process system the hardness of coating is about 6 H and for a vacuum sputtering process, the hardness of coating is about 9 H. The combination of vacuum sputtering process and wet process produce a coating with the hardness of about 8–9 H. The present invention is to provide the anti-reflection with anti-static layer system compose of basically three layers of oxide materials deposit by PVD system and only one layer of silica deposit by wet process from chemical solution. The design of vacuum sputtering process not only provide a high conductive ITO film in the CRT coating but also provide two layer of diffusion barrier to prevent the interaction between ITO and wet chemical. The present invention provided a high conductive anti-static process of anti-reflection coating which can be applied on the CRT surface coating.

There are four layer, namely, the first, second, third and fourth layers in consecutive numerical order beginning with the layer nearest from the substrate for the present invention of anti-reflection coating. The each layer was described in terms of physical thickness or optical thickness. The optical thickness is a mathematical product of a layers thickness and its refractive index. It is described as a fraction of a designed wavelength. In the present invention the designed wavelength is about 520 nm.

The first or the innermost layer 1 is a transparent conductive oxide material. The conductive oxide layer, preferably ITO, substantially little absorption for visible light, has a refractive index between 1.85 to 2.1 at a wavelength of about 520 nanometer (nm) and an optical thickness of about one sixth to one tenth wave length at the design wavelength.

The second layer is an oxide material. The oxide layer, preferably $SiO_2$, substantially non-absorption for visible light, has a refractive index between 1.45 to 1.50 at a wavelength of about 520 nanometer (nm) and a physical thickness of between 10 nm ato 50 nm at the design wavelength.

The third layer is also an oxide material. The oxide layer is similar to ITO in refractive index, preferably $SnO_2$, substantially non-absorption for visible light, has a refractive index between 1.85 to 2.2 at a wavelength of about 520 nm and a physical thickness of about 40.0 nm to 60.0 nm at the design wavelength. The fourth layer is the same as the second layer, but the second layer material is coated by sputtering method and the fourth layer is prepared by wet process from TEIS solution. The material commonly is called silica. This layer has a refractive index between 1.45 to 1.55 and an optical thickness of about one fourth wave length at the design wavelength.

In the preferred embodiment, the four layers coating includes a first layer of ITO having a thickness of 40 nm in sample 1 and 25 nm in sample 2. A second layer of $SiO_2$ having a thickness of about 20 nm in sample 1 and 25 nm in sample 2. A third layer of $SnO_2$ having a thickness of about 40 nm in sample 1 and 55 nm in sample 2 and a fourth layer is a layer of silica having a thickness about 85 nm in both of sample 1 and sample 2.

The stated objects are achieved by the invention, a low resistance between $10^2$ $\Omega$/square~$10^3$ $\Omega$/square can be obtain from the ITO coating, and a low reflection spectrum can be obtain on the CRT substrate in the visible range from 400 nm to 700 nm. All the reflection is below 5% at any wavelength from 400 nm to 700 nm in this 4 layers optical coating. It is demonstrated that the process is simple, reliable, easy control and economically. It has become possible in this way to produce an extremely low resistance, high hardness and low reflectance anti-reflection coating. Of particulate advantage, a batch or in-line sputtering system was suggest to deposit the first, second, and third layer of the present invention for low resistance, high optical performance and high scratch resistance. A wet coating process system was suggested to deposit the fourth layer of silica for low cost manufacturing.

On the other hand, the layer system of this invention is of high conductive for EMI (Electromagnetic Interference) shielding, extremely low reflection for optical view, high scratch resistance for surface hardness and low cost for manufacturing. For instance, a four layer anti-reflection and anti-static coating on CRT glass substrate according to the combination process of sputtering and wet process is described in this embodiment. The layer system has a low resistance between $10^2$ $\Omega$/square to $10^3$ $\Omega$/square to pass the certification of TCO 99, the layer system is hard enough to pass the scratch test of military standard MIL-C-48497 or MIL-C-675 and the optical quality is good enough to achieve the low reflection of CRT surface.

Thereby, a DC, AC or RF magnetron sputtering can be provide to deposit the first, second and third layer from ITO, Si and Sn targets in the presence of a sputter gas of mixture Ar and $O_2$, under a given pressure of approximately 3 m Torr (m=mili=0.001). For the fourth layer, it is proposed that by using wet process method such as spin coating or spray coating from a TEIS solution in the presence of coating under a temperature of 33° C. and baking condition of 200° C./30 min.

In the sample 2, the thickness of first, second and third oxide layer is 25, 30 and 55 nm, respectively. The thickness of fourth layer of silica is 95 nm. In this case, the resistance is about $3.8 \times 10^2$ Ω/square and the optically performance is a lower reflection wide band coating. The photopic reflectance is lower than 0.5%. Accordingly, the present invention having a layer system composed of three sputtering layers and one wet coating layer which is a high performance and economic process for the anti-reflection with anti-static coating on CRT glass.

The various objects and advantages of the present invention will be more readily understood from the following detailed description when read in conjunction with the appended drawing, in which:

DESCRIPTION OF THE PREFERRED EMBODIMENTS

The stated objects are achieved by the invention, a low resistance and reflectance can be obtain on CRT substrate in the visible light range from 400 nm to 700 nm by coating four layers with sputtering and wet coating process. The multilayer structure are numbered in sequence beginning from the innermost layer i.e. the layer first from a substrate surface on which the thin films is deposited. Layers thickness values are specified as either a physical thickness in nm or as an optical thickness as some fraction or multiple of a wavelength of visible light. The typical value is 520 nm.

Figure 1:
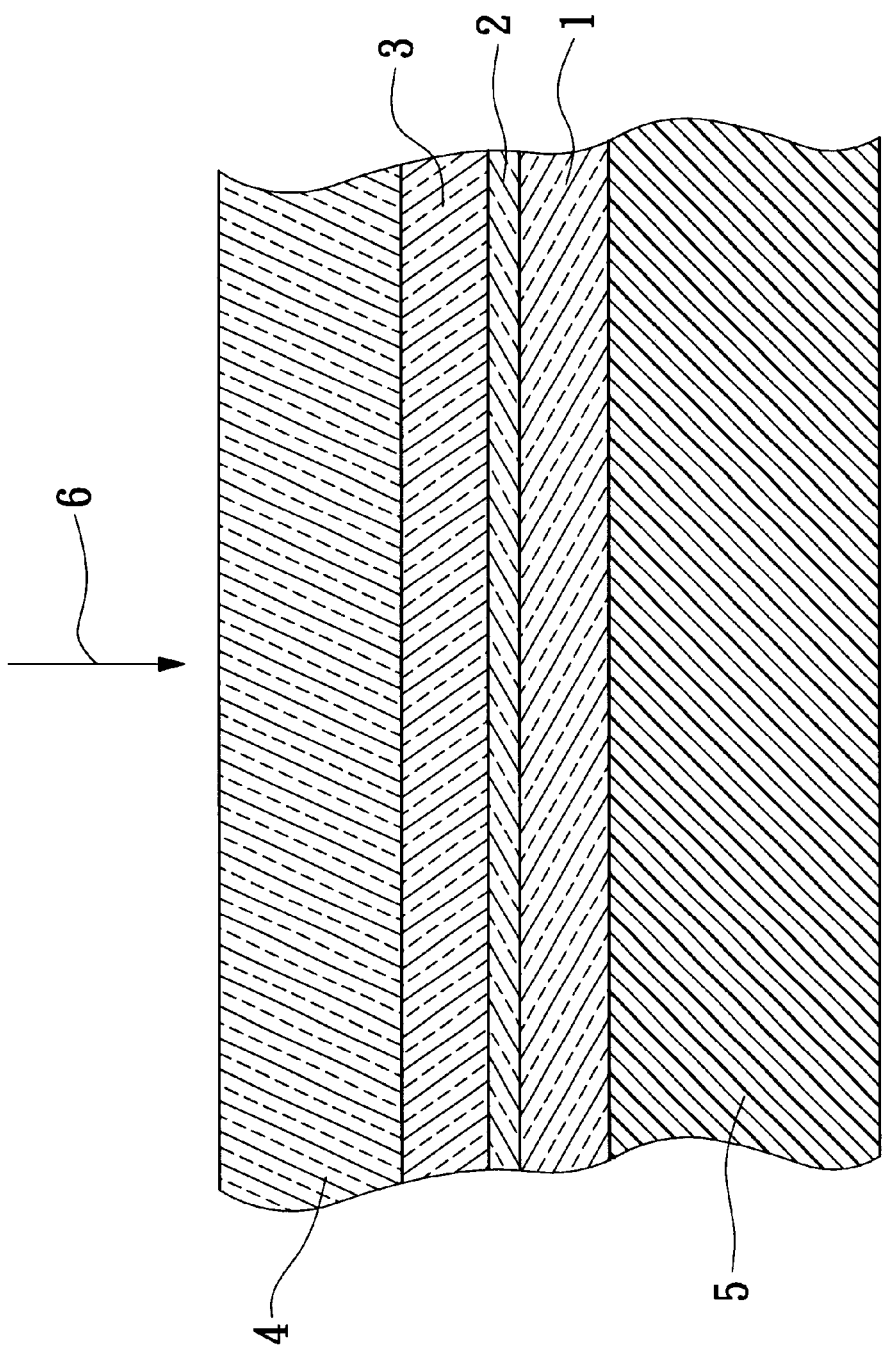
FIG. 1 schematically shows a cross sectional view of a layer system according to the present invention.

The layer structure of a preferred embodiment of the present invention is shown in FIG. 1. A substrate 5 can be a CRT glass, or another see-through materials. The direction of viewing is indicated by arrow 6. A layer 1, which is contacting the front side of the substrate 5, is called a first layer 1. In the direction to the observer follows the second layer 2 being arranged on the first layer 1 which is next to the front surface of the substrate. The third layer 3 of the four layers being arranged on second layer 2. The fourth layer, or the outermost layer 4 being arrange on the third layer 3. The layers 1,2,3 and 4 form a layer system of the present invention.

There are two type of this optical layer system, namely sample 1 and sample 2. In the sample 1, the first layer is indium tin oxide (ITO) with a thickness of 40 nm. It has a refractive index of about 1.98 at a wavelength of about 520 nm. The second layer 2 of the layer system is a $SiO_2$ layer with a thickness of 20 nm. The silicon dioxide has a refraction index of about 1.46 at a wavelength of about 520 nm. The $SiO_2$ is proposed as a diffusion barrier to prevent the interaction of ITO and wet chemical from the wet process. The third layer 3 is tin oxide ($SnO_2$) with a thickness of 40nm. The $SnO_2$ has a refractive index of about 2.00 at a wavelength of about 520 nm. This layer of $SnO_2$ is also as a diffusion barrier to prevent the interaction of ITO and wet chemical from the wet process. The fourth layer is silica with a thickness of 85 nm. The fourth layer has a refractive index of about 1.46–1.5 at a wavelength of about 520 nm. It was the only one layer material that coated by wet process from TEIS solution in atmosphere. The other layers of 1,2 and 3 were coated by sputtering process in vacuum system. In the sample 2, the thickness of first, second and third oxide layer is 25, 28 and 55 nm, respectively. The thickness of fourth layer of silica is 95 nm. In this case, the optical performance of the layer system of sample 2 is a wide band low reflection coating.

Figure 2:
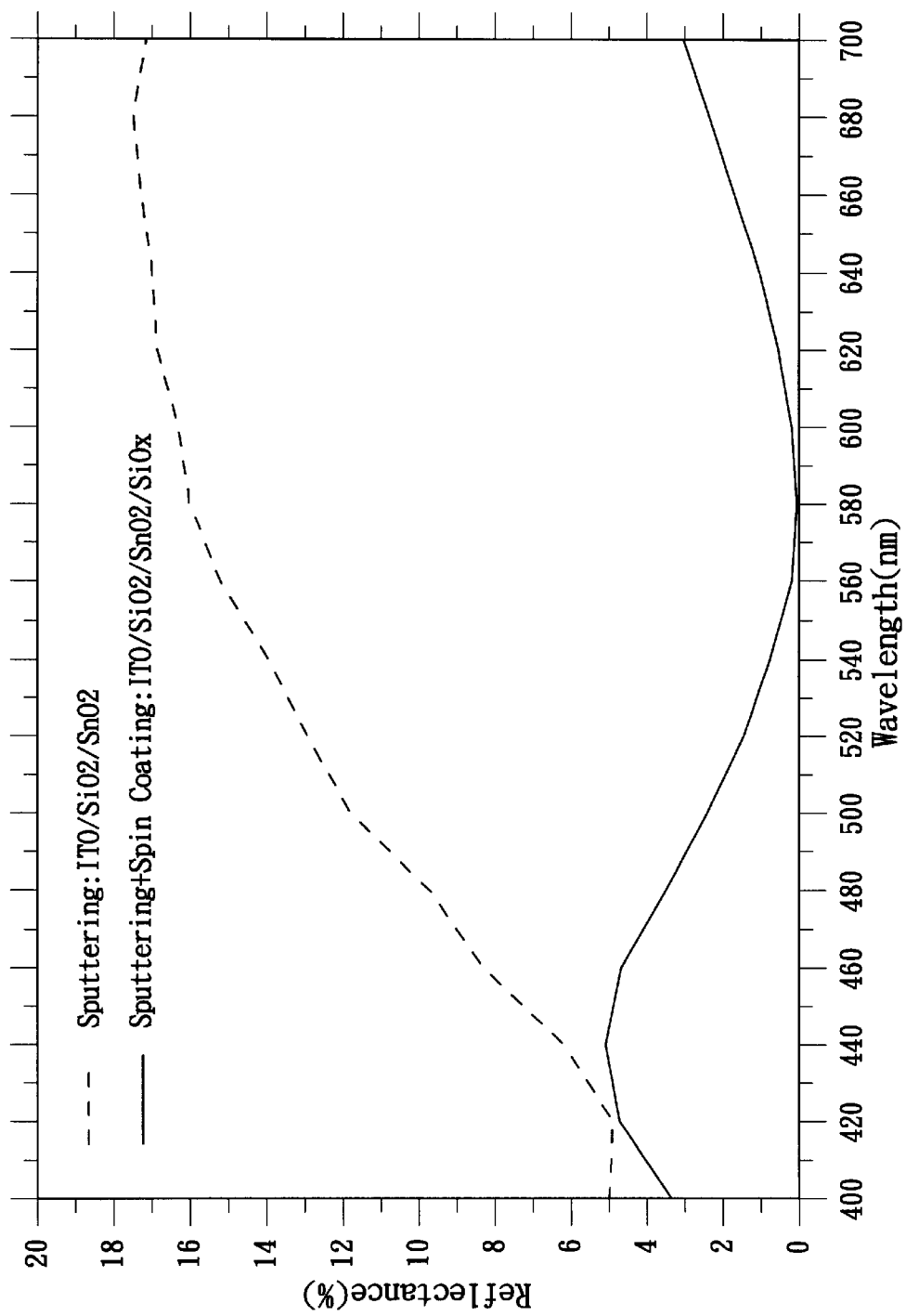
FIG. 2 shows the measured reflection curve in percent versus wavelength in nm of a layer system according to sample 1.

FIG. 2 shows the real reflection spectrum for the layer system of sample 1. The reflection was measured in percent at the front surface of the CRT glass. The visible spectrum is from a wavelength of 400 nm to a wavelength of 700 nm. The dot-line curve reveals the reflection of layer 1, 2 and 3 that are coated by sputtering system. The curve line of the four layer system reveals clearly that the reflection in the core wavelength region of the light particularly between 570 and 590 nm is extra ordinarily low 0.1% and the reflection is below 5% in any wavelength range 400 nm to 700 nm. The resistance of the layer system is about $1.36 \times 10^2$ Ω/square and the pencil hardness is about 9H. This result was good enough for CRT application. Table 1. Shows all the data of reflection from 400 nm to 700 nm, resistance, pencil hardness and CIE color.

Figure 3:
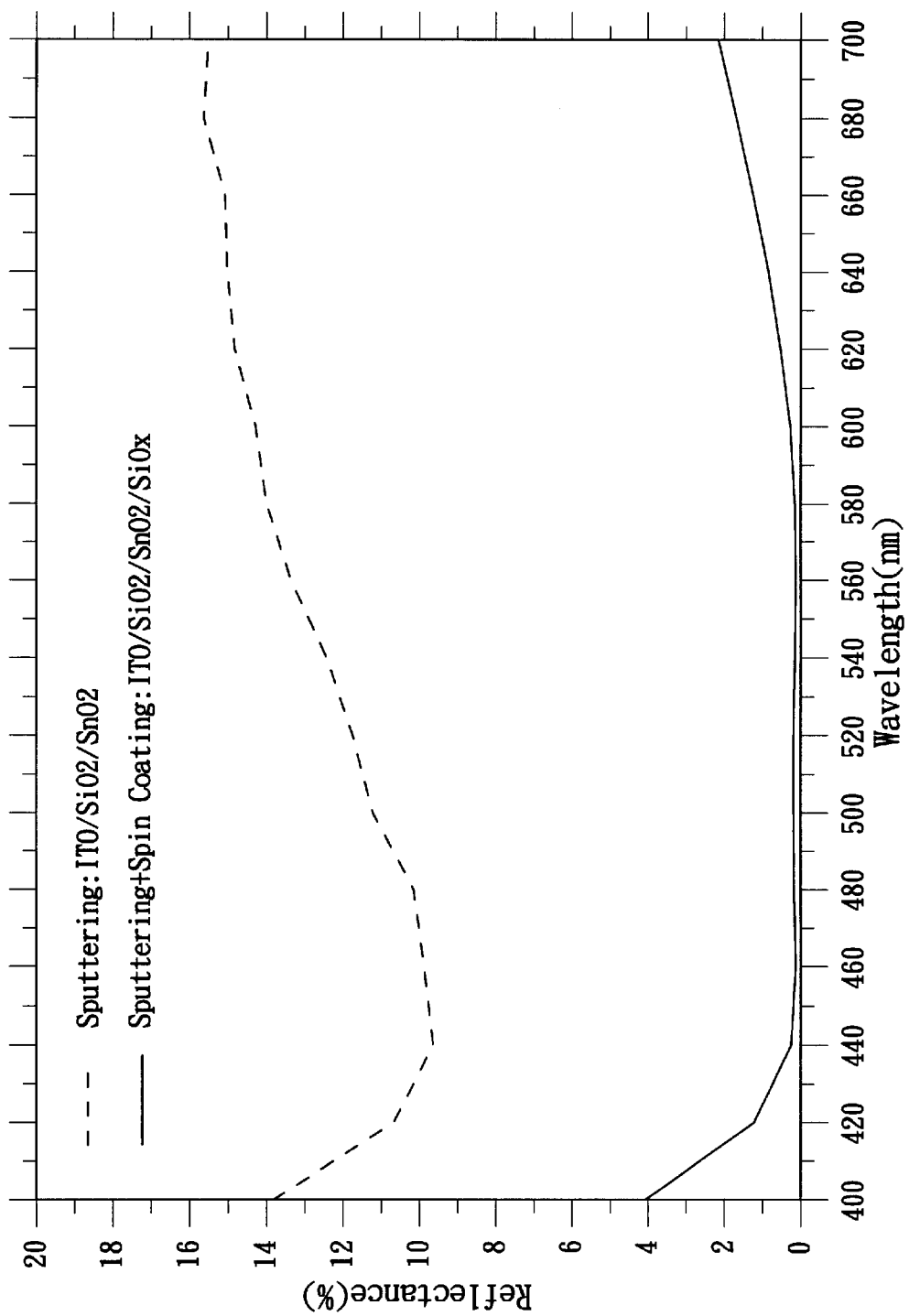
FIG. 3 shows the measured reflection curve in percent versus wavelength in nm of a layer system according to sample 2.

FIG. 3 shows the real reflection spectrum for the layer system of sample 2. The reflection was measured in percent at the front surface of the glass. The visible spectrum is from a wavelength of 400 nm to a wavelength of 700 nm. The dot-line curve reveals the reflection of layer 1, 2 and 3 that are coated by sputtering system. The curve line of the four layer system reveals clearly that the reflection in the core wavelength region of the light particularly between 440 to 580 nm is extra ordinarily low 0.2%. The optical performance is a low reflection wide band coating and the photopic reflectance is below 0.5% in the wavelength range from 400 nm to 700 nm. The resistance of the layer system is about $3.96 \times 10^2$ Ω/square and the pencil hardness is about 9 H. Table 2. Shows all the data of reflection from 400 nm to 700 nm, resistance, pencil hardness, CIE color and etc.

The sputtering of oxide layer 1, 2 and 3 were performed with a magnetron cathode in a reactive gas atmosphere composed of a gas mixture of Ar and $O_2$, The target materials for layer 1, 2 and 3 were ITO, Si and Sn, respectively. The target to substrate distance was about 15 cm. No heating device as applied during sputtering process. The silica layer 4 was coated with spin coating at the 33° C. substrate temperature then baking at the temperature of 200° C./30 min in atmosphere. All the working condition during sputtering and spin coating were described as table 3.

The following advantages are achieved with the invention:

The conventional wet process coating of anti-static and anti-reflection for CRT is difficult to pass the certification of TCO99, the film thickness and quality are very sensitive to temperature, it will rising many problem including resistance, optical effective and etc. The cost of chemical solution for low resistance wet coating process is very high and difficult to reach the order of $10^2$ Ω/square. The present invention provided a four layer system which included sputtering of three oxide layer and wet process coating of one oxide layer. There are two type of this optical layer system, namely sample 1 and sample 2. In the sample 1, the thickness of first, second and third oxide layer is 40, 20, and 40 nm, respectively. The thickness of fourth layer of silica is 85 nm. Because of the vacuum sputtering of conductive layer the resistance of the layer system in the present invention is low enough to reach $10^2$ Ω/square. The second layer and the third layer are also deposited by sputtering, it can be used as a diffusion barrier to prevent the interaction of ITO and wet chemical from the wet process. The sputtering third layer, namely $SnO_2$, it is well known difficult to etch by chemical solution. The fourth layer of silica is coating by wet process, it is an conventional process with low cost. Of particular interest, the resistance of the layer system is about $1.5 \times 10^2$ Ω/square and the reflection is below 5% in the wavelength range from 400 nm to 700 nm, the photopic reflectance of the whole spectrum is below 1%. It is a high performance of conductivity CRT application.

Although various minor modification may be suggested by those versed in the art, it should be understood that we wish to embody within the scope of the patent granted hereon all such modifications as reasonably and properly come within the scope of our contribution to the art.

TABLE 1

| Min. reflectance | Bottom wavelength | Resistance | Pencil hardness | CIE color (x, y) |
|---|---|---|---|---|
| 0.02% | 577.94 nm | $1.359 \times 10^2$ Ω/□ | 8H~9H | (0.26761, 0.20798) |

| Wavelength (nm) | Reflection (percent) | |
|---|---|---|
| | $CRT//ITO/SiO_2/SnO_2$ | $CRT//ITO/SiO_2/SnO_2/SiOx$ |
| 400 | 5.02 | 3.31 |
| 420 | 4.86 | 4.7 |
| 440 | 6.15 | 5.07 |
| 460 | 8.26 | 4.65 |
| 480 | 9.7 | 3.51 |
| 500 | 11.77 | 2.38 |
| 520 | 12.89 | 1.41 |
| 540 | 13.91 | 0.74 |
| 560 | 15.18 | 0.18 |
| 580 | 15.97 | 0.02 |
| 600 | 16.27 | 0.17 |
| 620 | 16.82 | 0.52 |
| 640 | 16.95 | 1.01 |
| 660 | 17.24 | 1.66 |
| 680 | 17.44 | 2.35 |
| 700 | 17.1 | 3.02 |

TABLE 2

| Min. reflectance | Bottom wavelength | Resistance | Pencil hardness | CIE color (x, y) |
|---|---|---|---|---|
| 0.16% (W-band) | 440~580 nm | $3.96 \times 10^2$ Ω/□ | 8H~9H | (0.31562, 0.12193) |

| Wavelength (nm) | Reflection (percent) | |
|---|---|---|
| | $CRT//ITO/SiO_2/SnO_2$ | $CRT//ITO/SiO_2/SnO_2/SiOx$ |
| 400 | 13.66 | 4.07 |
| 420 | 10.54 | 1.2 |
| 440 | 9.54 | 0.28 |
| 460 | 9.79 | 0.16 |
| 480 | 10.06 | 0.23 |
| 500 | 11.11 | 0.25 |
| 520 | 11.63 | 0.23 |
| 540 | 12.3 | 0.18 |
| 560 | 13.24 | 0.16 |
| 580 | 13.86 | 0.2 |
| 600 | 14.13 | 0.33 |
| 620 | 14.67 | 0.56 |
| 640 | 14.88 | 0.88 |
| 660 | 14.91 | 1.27 |
| 680 | 15.47 | 1.7 |
| 700 | 15.34 | 2.17 |

TABLE 3

| | | Thickness | | | |
|---|---|---|---|---|---|
| | Material | Sample 1 | Sample 2 | Coating method | Raw material | Coating condition |
| layer 1 | ITO | 40 nm | 25 nm | Sputtering | ITO | 3 mTorr |
| layer 2 | $SiO_2$ | 20 nm | 28 nm | Sputtering | Si | 3 mTorr |
| layer 3 | $SnO_2$ | 40 nm | 55 nm | Sputtering | Sn | 3 mTorr |
| layer 4 | Silica | 85 nm | 95 nm | Spin coating | TEIS | Coating temperature: 33° C. Baking Temperature: 200° C./30 min |

We claim:

1. An anti-reflection high conductivity multi-layer coating for CRT products comprising first, second, third and fourth consecutive layers with the first layer being the nearest layer to a substrate, said layers being created by a combination process including a vacuum coating and a wet coating;

said first layer being positioned between said substrate and said second layer and comprising a conductive oxide material having a refractive index between 1.85 to 2.1 at a wavelength of 520 nm, said first layer having a physical thickness of 20–80 nm, and being produced by vacuum sputtering coating;

said second layer being positioned on said first layer and comprising an oxide material having a refractive index within the approximating range of 1.45 to 1.50 at a wavelength of 520 nm and a physical thickness of 10 nm to 50 nm, said second layer being produced by vacuum sputtering coating;

said third layer being positioned on said second layer and comprising a high chemical resistance oxide material having a refractive index within 1.85 to 2.2 at a wavelength of 520 nm and a physical thickness of 40.0–60.0 nm, said third layer being produced by vacuum sputtering coating; and said fourth layer being positioned on said third layer and comprising an oxide material having a refractive index within 1.45 to 1.55 at a wavelength of 520 nm and a physical thickness of 60–120 nm, said fourth layer being produced by wet coating.

2. The anti-reflection high conductivity multi-layer coating of claim 1, wherein said substrate is CRT.

3. The anti-reflection high conductivity multi-layer coating of claim 1, wherein said substrate is glass.

4. The anti-reflection high conductivity multi-layer coating of claim 1, wherein the first layer is ITO, said second layer is SiO2, said third layer is SnO2 and fourth layer is silica.

5. The anti-reflection high conductivity multi-layer coating of claim 1, wherein the first layer comprises conductive oxides selected from the group consisting of ITO, IZO and ATO.

6. The anti-reflection high conductivity multi-layer coating of claim 1, wherein the second layer comprises oxides selected from the group consisting of $SiO_2$ and SiAl-Oxide.

7. The anti-reflection high conductivity multi-layer coating of claim 1, wherein the third layer comprises oxides selected from the group consisting of $SnO_2$ and ZnO.

8. The anti-reflection high conductivity multi-layer coating of claim 1, wherein the fourth layer comprises oxides selected from the group consisting of $SiO_2$, SiAl-Oxide and SiO compound.

9. The anti-reflection high conductivity multi-layer coating of claim 1, wherein the vacuum coating includes evaporating or sputtering coating in either a batch or an in-line system.

* * * * *